United States Patent [19]

Stone

[11] Patent Number: 4,523,315
[45] Date of Patent: Jun. 11, 1985

[54] RAMAN GAIN MEDIUM
[75] Inventor: Julian Stone, Rumson, N.J.
[73] Assignee: AT&T Bell Laboratories, N.J.
[21] Appl. No.: 367,093
[22] Filed: Apr. 9, 1982
[51] Int. Cl.³ .............................................. H01S 3/30
[52] U.S. Cl. ........................................ 372/3; 330/4.3;
372/4; 372/6; 372/55; 372/59
[58] Field of Search ...................... 372/3, 6, 4, 39, 55,
372/59; 307/426; 330/4.3

[56] References Cited
U.S. PATENT DOCUMENTS

| | | | |
|---|---|---|---|
| 3,705,992 | 12/1972 | Ippen et al. | 307/88.3 |
| 4,039,851 | 8/1977 | Jain et al. | 307/88.3 |
| 4,044,315 | 8/1977 | Snitzer | 372/6 |
| 4,063,106 | 12/1977 | Ashkin et al. | 307/88.3 |
| 4,394,623 | 7/1983 | Kurnit | 372/3 |

OTHER PUBLICATIONS

Stone et al., "Overtone Vibrations of OH Groups in Fused Silica Optical Fibers", J. Chem. Phys. 76(4), Feb. 15, 1982, pp. 1712–1722.
Hartwig, "Raman Scattering from Hydrogen and Deuterium Dissolved in Silica as a Function of Pressure", J. of Appl. Phys. vol. 47, No. 3, Mar. 1976, pp. 956–959.
Journal of Non-Crystalline Solids 5, "Properties and Structure of Vitreous Silica. II" R. Bruckner, 1971, pp. 177–216.
Grasiuk et al, "Tunable High Power Raman Lasers and Their Applications", *Conference: Proceedings of the Conference on Tunable Lasers and Applications*, Loen, Norway, Jun. 6–11, 1976, pp. 88–95.

*Primary Examiner*—James W. Davie
*Attorney, Agent, or Firm*—Sylvan Sherman; Eugen E. Pacher

[57] ABSTRACT

A new Raman gain medium, comprising an optical fiber into which molecular gas has been diffused, is disclosed. This new medium combines the advantages of a fiber, i.e., long interaction path, low loss, controllable dispersion, and convenience in handling, with the large Raman wave number shift of the gas, i.e., 4136 cm$^{-1}$ for $H_2$ in silica. A laser made with such a medium can provide a relatively high power, tunable, coherent signal source in the near and far infrared regions.

10 Claims, 2 Drawing Figures

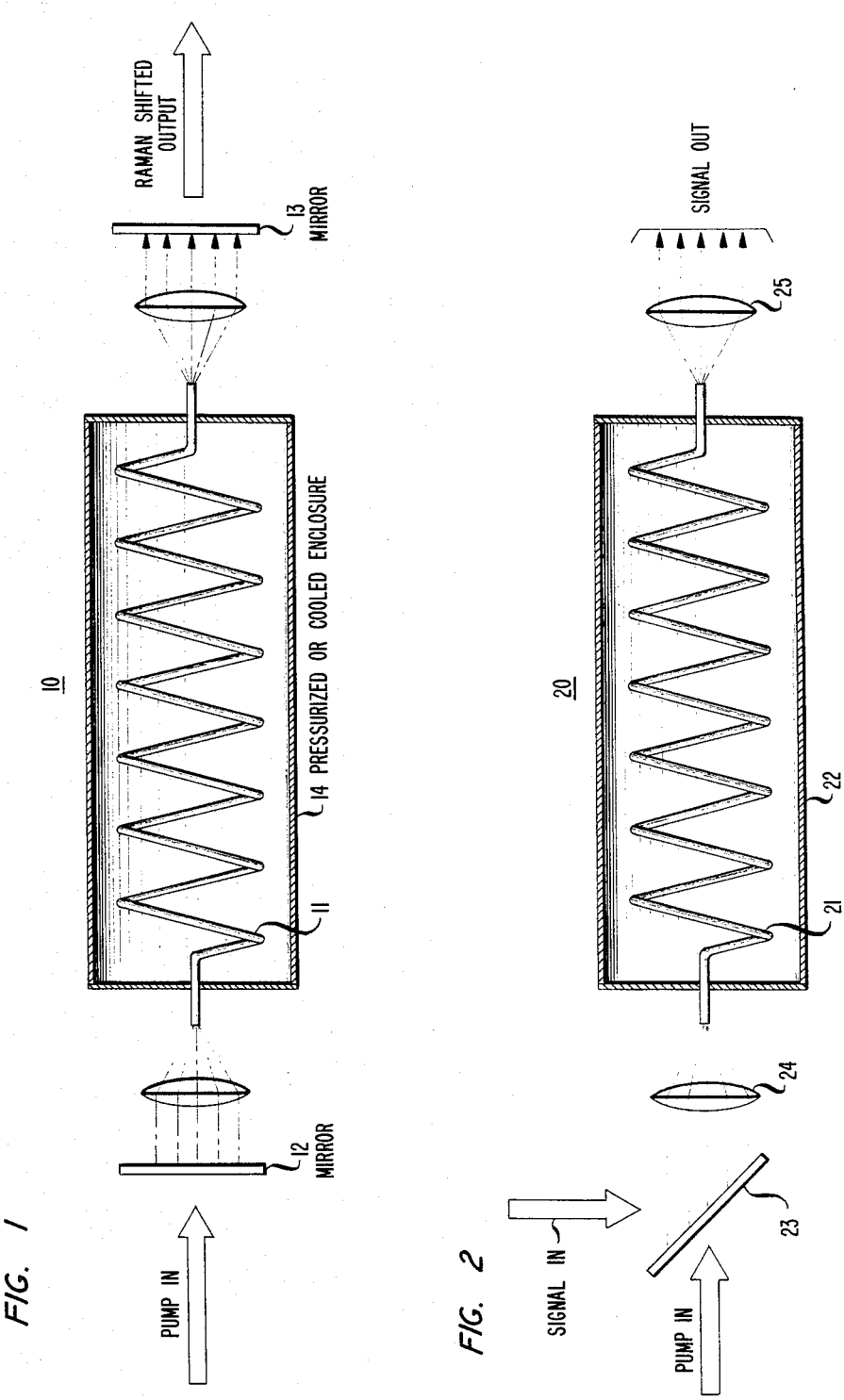

RAMAN GAIN MEDIUM

TECHNICAL FIELD

This invention relates to Raman gain media for use in optical lasers and amplifiers.

BACKGROUND OF THE INVENTION

Stimulated Raman scattering can be viewed as a modulation process produced by molecular vibrations. In the process, the application of an incident radiation, i.e., pump radiation, results in the generation of upper and lower sidebands. In particular, it is the frequency shift to longer wavelengths that is of special interest in that it provides a means for generating coherent radiation in the 1 $\mu$m to 1.8 $\mu$m range. This range includes the 1.3 $\mu$m and 1.55 $\mu$m wavelengths which are of particular interest in long distance optical transmission systems.

Raman signal sources currently available include silica Raman fiber lasers which are pumped by mode locked and Q-switched Nd:YAG lasers having 100 picoseconds pulse widths. While silica fiber lasers are reliable and simple, their outputs are not continuously tunable with currently available pump sources. In addition, the silica Raman shift is relatively small (i.e., 400 cm$^{-1}$). (See, for example, U.S. Pat. No. 3,705,992, issued Dec. 12, 1972.) As a consequence, one cannot obtain very short (i.e., 1 picosecond) Raman shifted output pulses in the infrared region inasmuch as the short picosecond sources are only available in the visible region.

Alternative sources are the tunable F-center lasers, which are more difficult to operate and are fairly short lived, and the Raman gas lasers. The gain medium in the latter are one or more gases under pressure. Typically, each gas has a different Raman shift, thereby providing a plurality of output signals over the band of interest. The problem with these arrangements resides in the small interaction path which, in turn, results in only modest output power levels unless very large pump powers are used.

SUMMARY OF THE INVENTION

A new Raman gain medium, in accordance with the present invention, comprises a lightguide, such as an optical fiber, into which one or more gases have been diffused and reside therein in molecular form. When used as a Raman laser, such a gas-in-glass medium combines the advantages of the prior art Raman fiber lasers and the Raman gas lasers. By using a lightguide as the host, long, stable interaction lengths, and correspondingly higher powers, are obtainable. By using a gas as the active material, the desired Raman shift can be more readily obtained. In particular, Raman shifts into the far infrared region can be achieved.

BRIEF DESCRIPTION OF THE DRAWING

FIG. 1 shows a Raman oscillator employing a gas-in-fiber gain medium; and

FIG. 2 shows a Raman amplifier employing a gain medium in accordance with the invention.

DETAILED DESCRIPTION

Referring to the drawings, FIG. 1 shows a laser 10 employing a Raman gain medium 11 in accordance with the present invention. As in the typical laser, the gain medium is disposed within a resonant cavity formed by a pair of mirrors 12 and 13, at least one of which, i.e., 13, is partially transmissive at the wavelength of the laser output signal. The other mirror 12 is highly reflective at the wavelength of the output signal but highly transmissive at the wavelength of the input pump signal. (For examples of fiber Raman laser configurations see U.S. Pat. Nos. 4,039,851 and 4,063,106.)

In accordance with the illustrative embodiment of FIG. 1, the gain medium 11 comprises a length of optical fiber into which molecular gas is diffused, and remains therein in molecular form. In particular, since the gain medium in the instant invention is based upon the vibrational Raman shift, a diatomic gas molecule is employed. Larger multiatomic gas molecules can be employed provided there is room for them in the host interstice. Examples of gases that have been diffused into glass and can be used are $H_2$, $O_2$, $N_2$, and their isotopes. (See, for example, the article entitled "Properties and Structure of Vitreous Silica II" by R. Bruckner, published in the *Journal of Non-Crystalline Solids* 5 (1971), pp. 177–216.)

The host can be any type of glass or crystal material. However, in all cases laser or amplifier operation is limited to only that part of the spectrum for which the host material is transparent.

In an illustrative embodiment of the invention a hydrogen ($H_2$) impregnated silica fiber was employed. The fiber, 485 meters long, comprised a 3.9 $\mu$m diameter core of $GeO_2$-$P_2O_5$ doped silica surounded by a silica cladding having a 63 $\mu$m outside diameter. The attenuation for this fiber was 8 dB/km at 0.647 $\mu$m and 1.6 dB/km at 0.883 $\mu$m. Hydrogen was diffused into the fiber at a pressure of 7300 psi at room temperature for a period of three weeks. The resulting $H_2$ concentration in the silica, held interstitially, is the equivalent of about 15 atmospheres.

The stimulated Raman gain coefficient, $\gamma$, for any particular medium can be determined experimentally by applying a pump, and measuring the power gain at the Raman shifted wavelength with a probe signal. If $P_{in}$ and $P_o$ are the measured input and output powers of the probe, and $P_p$ the pump power, $\gamma$ can be computed from the following relationship:

$$P_o/P_{in} = \gamma \cdot (P_p/A) \cdot L,$$

assuming negligible attenuation of the pump, where P1
A is the effective mode cross sectional area;
and
L is the interaction path length.

For the particular medium described above, a krypton laser source, operating at a wavelength of 0.647 $\mu$m, was used as the pump, and an injection laser, operating at the Raman shifted wavelength of 0.883 $\mu$m, provided the input probe signal. The resulting measurements and calculation yielded a $\gamma$ of $2.5 \times 10^{-12}$ cm/W. Taking into account the relative line widths of $H_2$ in silica and $H_2$ as a gas, and the relative interaction lengths of the fiber and a conventional gas cell, an enhancement of $2 \times 10^4$ in gain is realized by this fiber medium as compared to a conventional gas cell.

Because the gas that has been diffused into the fiber can just as readily diffuse out, the gain medium is advantageously kept within an enclosure that is either pressurized or cooled in order to retard the out-diffusion process. If cooled sufficiently, some increase in gain can also be realized. For example, at liquid nitrogen temperatures, an increase in the gain of about 50 percent can be obtained. An alternative to either of the above is to coat the fiber with an inert layer of material that is impervious to the diffused gas.

A gas-in-fiber gain medium can also be used as an amplifier 20, rather than an oscillator, as illustrated in FIG. 2. As in the oscillator, the gain medium 21 is advantageously disposed in a suitably maintained enclosure. The signal to be amplified, along with the pump signal is injected into one end of the fiber and the amplified signal obtained at the other end. Suitable mirrors and lenses 23, 24 and 25 are included for coupling in an out of the amplifier.

Because Raman shifts into the far infrared region are obtainable in a gain medium of the type described hereinabove, IR fibers are advantageously employed. These include antimony doped $GeO_2$ fibers, polycrystalline $ThCl_2$ fibers, and single crystal fibers made of sapphire, YAG or yttria. The gases can be selected from among the group including hydrogen, nitrogen and oxygen and isotopes of these gases, and larger multiatomic molecules that can be accommodated by the host.

What is claimed is:

1. A Raman laser comprising
   a gain medium comprising a length of filamentary waveguide comprising multiatomic Raman-active molecules contained interstitially in at least some of the waveguide material, the laser further comprising
   means for coupling pump radiation into the waveguide,
   means for resonating within the waveguide Raman radiation emitted by the molecules
   and
   means for coupling at least a part of the Raman radiation out of the waveguide.

2. A Raman laser according to claim 1 wherein the filamentary waveguide comprises silica, and the molecules are selected from the group consisting of hydrogen, oxygen, nitrogen and their isotopes.

3. A Raman laser according to claim 1 wherein the filamentary waveguide comprises a length of optical fiber adapted for transmitting therethrough infrared radiation.

4. A Raman laser according to claim 1 including means for inhibiting the out-diffusion of the molecules from the waveguide material.

5. A Raman laser according to claim 4 wherein the inhibiting means comprise a pressurized enclosure, or a refrigerated enclosure, or a fiber coating that is relatively impervious to the interstitial molecular species.

6. A Raman amplifier comprising a gain medium comprising a length of filamentary waveguide comprising multiatomic Raman-active molecules contained interstitially in at least some of the waveguide material, and further comprising means for coupling pump radiation into the waveguide, means for coupling signal radiation into the waveguide, and means for coupling signal radiation out of the waveguide.

7. A Raman amplifier according to claim 6 wherein said filamentary waveguide comprises silica, and said molecules are selected from the group consisting of hydrogen, oxygen, nitrogen and their isotopes.

8. A Raman amplifier according to claim 6 wherein said filamentary waveguide comprises a length of optical fiber adapted for transmitting therethrough infrared radiation.

9. A Raman amplifier according to claim 6 including means for inhibiting the out-diffusion of said molecules from the waveguide material.

10. A Raman amplifier according to claim 9 wherein said inhibiting means comprises a pressurized enclosure, or a refrigerated enclosure, or a fiber coating that is relatively impervious to the interstitial molecular species.

* * * * *